United States Patent [19]

Deyle, Jr. et al.

[11] Patent Number: 4,811,867

[45] Date of Patent: Mar. 14, 1989

[54] PARTICLE ANTI-BRIDGING APPARATUS

[75] Inventors: William J. Deyle, Jr., Penfield; John M. Wysocky, Rochester, both of N.Y.

[73] Assignee: Xerox Corporation, Stamford, Conn.

[21] Appl. No.: 711,136

[22] Filed: Mar. 13, 1985

[51] Int. Cl.⁴ .............................................. G01F 11/00

[52] U.S. Cl. .................................... 222/231; 222/234; 222/DIG. 1; 366/156; 366/320

[58] Field of Search ............... 222/228, 231, 232, 233, 222/234, DIG. 1, 410–413; 355/15; 15/308; 366/156, 320

[56] References Cited

U.S. PATENT DOCUMENTS

| | | | |
|---|---|---|---|
| 1,548,558 | 8/1925 | Shutterly | 222/231 |
| 1,836,537 | 12/1931 | Lawrence | 222/231 |
| 2,031,820 | 2/1936 | Crawford | 221/106 |
| 2,536,787 | 1/1951 | Turner | 222/231 X |
| 3,224,649 | 12/1965 | Gunto | 222/199 |
| 3,474,937 | 10/1969 | Frey | 222/227 |
| 3,773,220 | 11/1973 | Morgan et al. | 222/231 X |
| 4,305,529 | 12/1981 | Spehrley, Jr. | 222/228 |
| 4,456,364 | 6/1984 | Hatzis | 366/320 X |
| 4,530,597 | 7/1985 | Itaya et al. | 355/15 |

FOREIGN PATENT DOCUMENTS

| | | | |
|---|---|---|---|
| 541090 | 2/1977 | U.S.S.R. | 222/228 |
| 424875 | 3/1935 | United Kingdom | 366/156 |

*Primary Examiner*—F. J. Bartuska
*Assistant Examiner*—Nils E. Pedersen
*Attorney, Agent, or Firm*—H. Fleischer; J. E. Beck; R. Zibelli

[57] ABSTRACT

An apparatus in which particles are dispensed from an open ended chamber of a container into a transport adapted to move the particles therefrom. The apparatus prevents the bridging and caking of particles in the chamber. A member, positioned in the chamber of the container in the region of the open end thereof, is in engagement with the transport. The member is resiliently coupled to the container and agitated as the transport moves the particles. This causes the springs resiliently coupling the member to the container to vibrate. As the springs vibrate, bridging and caking of the particles is prevented and the particles are dispensed from the open end of the chamber in the container.

12 Claims, 3 Drawing Sheets

PARTICLE ANTI-BRIDGING APPARATUS

This invention relates generally to an electrophotographic printing machine, and more particularly concerns an apparatus for preventing the bridging and caking of particles being dispensed from the chamber of a container.

Generally, the process of electrophotographic printing includes charging a photoconductive member to a substantially uniform potential so as to sensitize the surface thereof. The charged portion of the photoconductive surface is exposed to a light image of an original document being reproduced. This records an electrostatic latent image on the photoconductive member corresponding to the informational areas contained within the original document. After the electrostatic latent image is recorded on the photoconductive member, the latent image is developed by bringing a developer material into contact therewith. This forms a powder image on the photoconductive member which is subsequently transferred to a copy sheet. Finally, the powder image is heated to permanently affix it to the copy sheet in image configuration.

A suitable developer material frequently comprises carrier granules having toner particles adhering triboelectrically thereto. The two component mixture is brought into contact with the photoconductive surface. Toner particles are attracted from the carrier granules to the latent image. Those toner particles adhering to the latent image form a powder image on the photoconductive surface.

In most instances, residual toner particles remain adhering to the photoconductive surface. These residual toner particles are removed therefrom at the cleaning station. Residual toner particles may be reclaimed by being recycled to the development station. Alternatively, these residual particles may be transported to a bottle which is subsequently removed from the printing machine and discarded. In either event, it is necessary to insure that the toner particles do not bridge or cake as they are being transported away from the cleaning station.

Various approaches have been devised to prevent bridging and caking of particles within a hopper. The following disclosures appear to be relevant:

U.S. Pat. No.: 2,031,820, Patentee: Crawford, Issued: Feb. 25, 1936.

U.S. Pat. No.: 3,224,649, Patentee: Gunto, Issued: Dec. 21, 1965.

U.S. Pat. No.: 3,474,937, Patentee: Frey, Issued: Oct. 28, 1969.

U.S. Pat. No.: 4,305,529, Patentee: Spehrley, Jr., Issued: Dec. 15, 1981.

The relevant portions of the foregoing disclosures may be briefly summarized as follows:

Crawford discloses a dispensing apparatus having an agitator. A weight is positioned in the agitator to prevent the powder from caking therein. The agitator is a perforate hollow member formed from a screen or wire mesh. The upper vanes of a valve support the agitator. When the vanes of the valve rotate, the agitator is shifted so as to effectively mix the particles therein.

Gunto discloses a developer unit which includes a powder feeding assembly. The powder feeding assembly has a supply receptacle with a pair of downwardly inclined sidewalls defining an elongated bottom opening through which powder is discharged. A V-shaped trough is disposed below and in alignment with the bottom opening. The trough is mounted in an inclined position so that the lower end forms an outlet. A plurality of spheres are disposed in the opening resting on opposite sidewalls of the trough. The spheres substantially fill the opening being spaced slightly above the apex of the trough. These spheres tend to roll downwardly and bear against each other. The spheres are irregularly shaped quartz balls or any other suitable material such as steel or ceramic substances. The trough is secured to a vibrator assembly. Energization of the vibrator assembly causes oscillation of the trough. Vibration of the trough moves the spheres to loosen the toner in the supply receptacle. This provides a flow of toner from the receptacle.

Frey discloses a dispenser having a hopper with a rotatable shaft extending across the open end thereof. The shaft has blades extending outwardly therefrom which engage a spring extending downwardly from one sidewall of the hopper.

Spehrley, Jr. describes a toner dispenser having a hollow sphere positioned within the hopper of the toner dispenser. A valve is located in the open end of the hopper. The sphere engages the valve. As the valve rotates to discharge toner particles, the sphere is agitated preventing bridging and caking of the toner particles being discharged from the hopper.

In accordance with the features of the present invention, there is provided an apparatus for preventing the bridging and caking of particles in an open ended chamber of a container dispensing the particles therefrom into a transport adapted to move the particles. A member, positioned in the chamber of the container in the region of the open end thereof, is in engagement with the transport. Means are provided for coupling resiliently the member to the container with the member being agitated as the transport moves the particles. This causes the resilient means to vibrate preventing bridging and caking of the particles being dispensed from the open end of the chamber of the container.

Pursuant to another aspect of the present invention, there is provided an electrophotographic printing machine of the type having a cleaning station for removing residual toner particles from a photoconductive member. A container, in communication with the cleaning station has an open ended chamber for receiving the toner particles removed from the photoconductive member. Means, positioned to receive the toner particles discharged from the open end of the chamber of the container, transport the toner particles to a location remote from the cleaning station. A member, positioned in the open end of the chamber of the container, is in engagement with the transporting means. Means are provided for coupling resiliently the member to the container with the member being agitated as the transporting means moves the toner particles. This causes the resilient means to vibrate preventing bridging and caking of the toner particles being discharged from the open end of the chamber of the container.

Other aspects of the present invention will become apparent as the following description proceed and upon reference to the drawings, in which.

While the present invention will hereinafter be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

Figure 1:
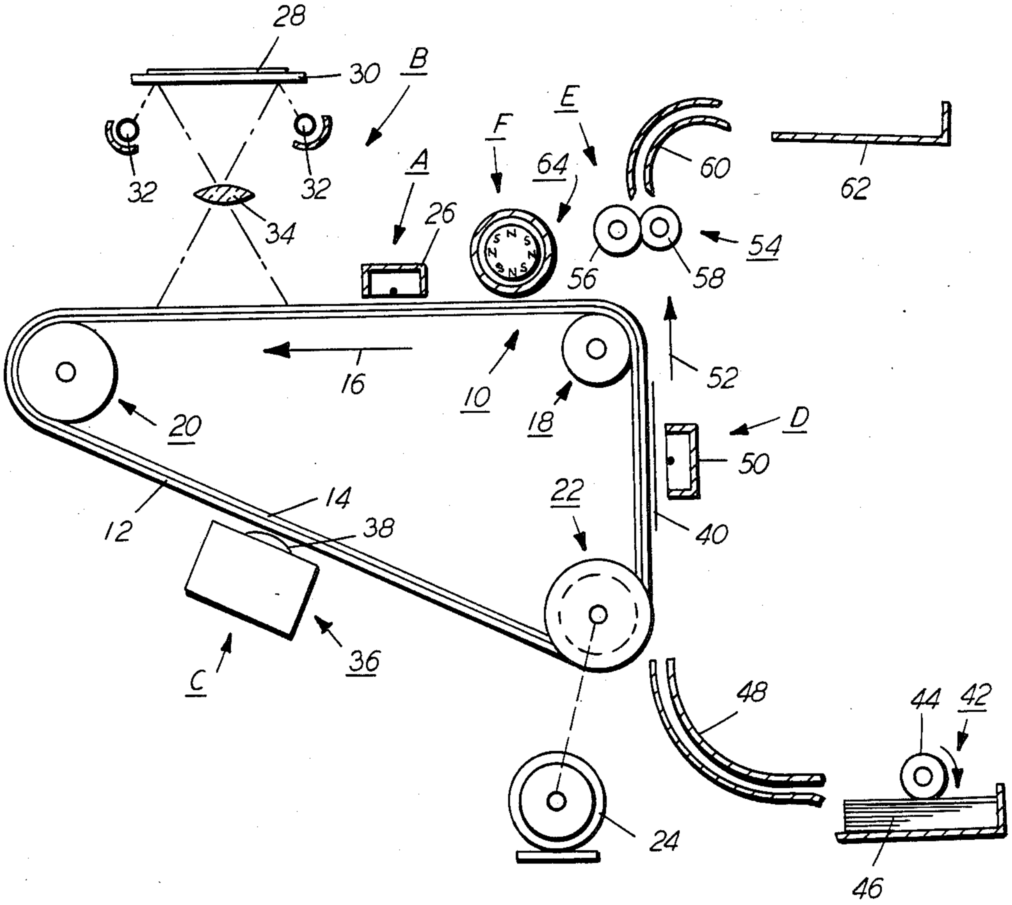
FIG. 1 illustrates a schematic elevation view of an illustrative electrophotographic printing machine incorporating a cleaning station having the features of the present invention therein.

For a general understanding of the features of the present invention, reference is had to the drawings. In the drawings, like reference numerals have been used throughout to designate identical elements. FIG. 1 schematically depicts the various components of an illustrative electrophotographic printing machine incorporating the particle dispensing and anti-bridging apparatus of the present invention therein. It will become evident from the following discussion that this apparatus is equally well suited for use in a wide variety of machines and is not necessarily limited in its application to the particular embodiment depicted herein.

Inasmuch as the art of electrophotographic printing is well known, the various processing stations employed in the FIG. 1 printing machine will be shown hereinafter schematically and their operation described briefly with reference thereto.

Turning now to FIG. 1, the electrophotographic printing machine employs a belt 10 having a photoconductive surface 12 deposited on a conductive substrate 14. Preferably, photoconductive surface 12 is made from a selenium alloy. Conductive substrate 14 is made preferably from aluminum which is electrically grounded. Other suitable photoconductive surfaces and conductive substrates may also be employed. Belt 10 moves in the direction of arrow 16 to advance successive portions of photoconductive surface 12 through the various processing stations disposed about the path of movement thereof. As shown, belt 10 is entrained about a stripping roller 18, tension roller 20, and drive roller 22. Drive roller 22 is mounted rotatably and in engagement with belt 10. Motor 24 rotates roller 22 to advance belt 10 in the direction of arrow 16. Roller 22 is coupled to motor 24 by suitable means such as a drive belt.

With continued reference to FIG. 1, initially a portion of belt 10 passes through charging station A. At charging station A, a corona generating device indicated generally by the reference numeral 26 charges photoconductive surface 12 of belt 10 to a relatively high, substantially uniform potential.

Next, the charged portion of photoconductive surface 12 is advanced through exposure station B. At exposure station B, an original document 28 is positioned face down upon a transparent platen 30. Lamps 32 flash light rays onto original document 28. The light rays reflected from original document 28 are transmitted through lens 34 forming a light image thereof. Lens 34 focuses the light image onto the charged portion of photoconductive surface 12 to selectively dissipate the charge thereon. This records an electrostatic latent image thereon corresponding to the informational areas contained within the original document. Thereafter, belt 10 advances the electrostatic latent image recorded on photoconductive surface 12 to development station C.

At development station C, a magnetic brush development system, indicated generally by the reference numeral 36, transports the developer mixture of carrier granules and toner particles into contact with photoconductive surface 12. Magnetic brush development system 36 includes a magnetic brush developer roller 38. Developer roller 38 advances the developer mixture into contact with photoconductive surface 12. The developer roller forms a brush comprising carrier granules and toner particles. The toner particles are attracted from the carrier granules to the electrostatic latent image forming a toner powder image on photoconductive surface 12 of belt 10.

After development, belt 10 advances the toner powder image to transfer station D. At transfer station D, a sheet of support material 40 is moved into contact with the toner powder image. The sheet of support material is advanced to transfer station D by a sheet feeding apparatus 42. Preferably, sheet feeding apparatus 42 includes a feed roll 44 contacting the uppermost sheet of stack 46. Feed roll 44 rotates to advance the uppermost sheet from stack 46 into chute 48. Chute 48 directs the advancing sheet of support material into contact with photoconductive surface 12 of belt 10 in a timed sequence so that the toner powder image developed thereon contacts the advancing sheet of support material at transfer station D.

Transfer station D includes a corona generating device 50 which sprays ions onto the backside of sheet 40. This attracts the toner powder image from photoconductive surface 12 to sheet 40. After transfer, the sheet continues to move in the direction of arrow 52 onto a conveyor (not shown) which advances the sheet to fuser station E.

Fuser station E includes a fuser assembly, indicated generally by the reference numeral 54, which permanently affixes the transferred powder image to sheet 40. Preferably, fuser assembly 54 includes a heated fuser roller 56 and a back-up roll 58. Sheet 40 passes between fuser roll 56 and back-up roll 58 with the toner powder image contacting fuser roll 56. In this manner, the toner powder image is permanently affixed to sheet 40. After fusing, chute 60 guides the advancing sheet 40 to catch tray 62 for subsequent removal from the printing machine by the operator.

Invariably after the sheet of support material is separated from photoconductive surface 12 of belt 10, some residual toner particles remain adhering thereto. These residual toner particles are removed from photoconductive surface 12 at cleaning surface F. Cleaning station F includes a magnetic brush cleaning roller 64 that removes the residual toner particles from photoconductive surface 12. The residual toner particles are attracted to toner and waste rollers (not shown) from cleaning roller 64. A blade (not shown) removes the residual toner particles from the toner and roller. The residual toner particles fall into a hopper for subsequent dispensing therefrom. The detailed structure of the cleaning station is described more fully in U.S. patent application Ser. No. 130,805, filed in 1980, now abandoned, the relevant portions thereof being hereby incorporated by reference thereto into this application. The particles removed from the photoconductive surface may either be recirculated back to the development system for subsequent re-use or may be transported to a container at a remote location which is subsequently removed from the printing machine when filled with residual toner particles. In either case, the toner particles are removed from photoconductive surface 12 by cleaning roller 64 and are received by a hopper. These toner particles are then dispensed from the hopper into an auger which advances the toner particles to a location remote from cleaning station F. The structure of the dispensing system for transporting the toner particles is shown in greater detail with reference to FIGS. 2 through 4, inclusive.

After cleaning, a discharge lamp (not shown) floods photoconductive surface 12 with light to dissipate any residual charge thereon prior to the charging thereof for the next successive imaging cycle.

Figure 2:
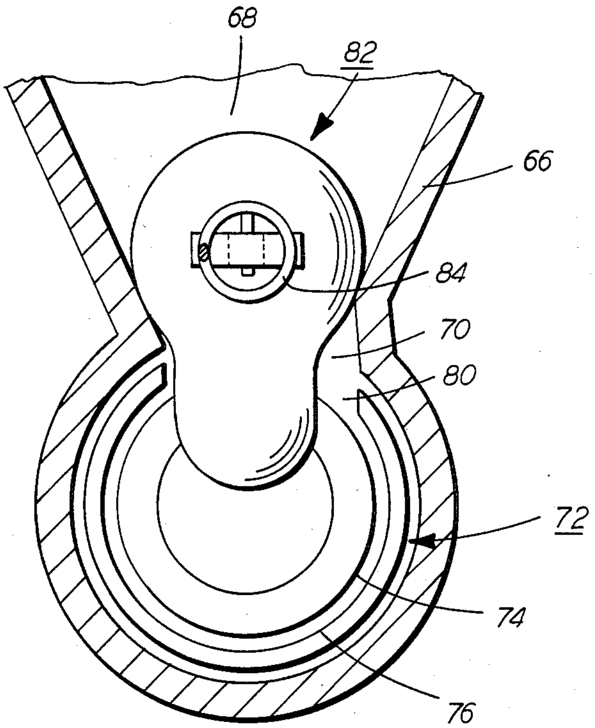
FIG. 2 shows a schematic elevational view of the dispensing apparatus of the present invention.

Referring now to FIG. 2, there is shown the details of the dispensing and transporting system of cleaning station F. As depicted thereat, the toner particles removed from photoconductive surface 12 by cleaning roller 64 are received in hopper 66. Hopper 66 includes chamber 68 having an open end 70 along the entire length thereof. Toner particles are dispensed from open end 70 of chamber 68 into a auger tube assembly 72. Auger tube assembly 72 includes a spiral spring member 74 disposed interiorly of a tube 76. As drive (not shown) rotates spring member 74, toner particles discharged from open end 70 of chamber 68 are advanced therealong. Tube 76 has an opening 80 which is positioned parallel with open end 70 to receive the toner particles discharged therefrom. Agitator member 82 is positioned in the open end 70 of chamber 68. Agitator member 82 is connected to the endwalls of hopper 66 by springs 84. Caking and bridging of the toner particles is prevented by vibration of springs 84. More particularly, as the drive 78 rotates spring member 74, the coils thereof agitate or move member 82. This causes springs 84 to vibrate breaking up any caking and bridging of the toner particles in open end 70 of chamber 68 of hopper 66. The detailed structure of agitator member 82 will be shown more clearly with reference to FIGS. 3 and 4.

Figure 3:
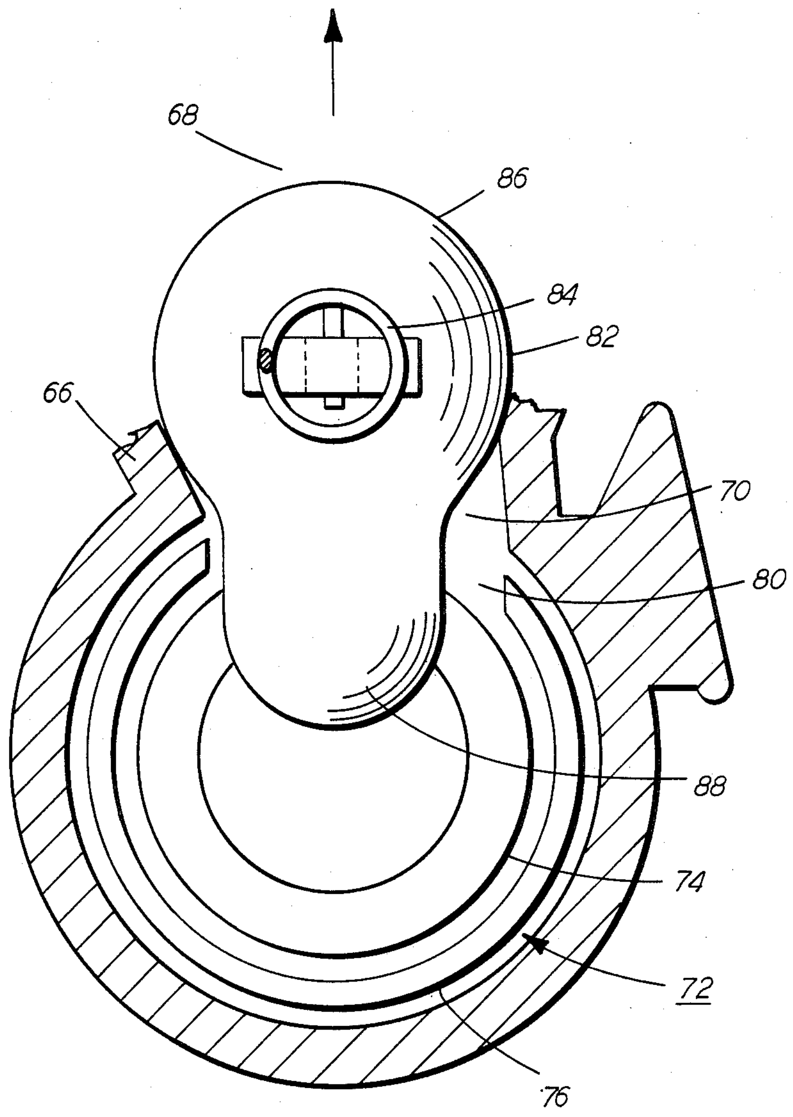
FIG. 3 is an enlarged, fragmentary elevation view showing the agitating member.

As shown in FIG. 3, agitator member 82 includes a spherical portion 86 having a diameter greater than the width of open end 70 of chamber 68. A cylinderical portion 88 protrudes from spherical portion 86 through open end 70 of chamber 68. Cylindrical portion 88 engages the coils of spiral spring member 74. Thus, as spring member 74 rotates, agitator member 82 is vibrated. Agitator member 82 is connected to the endwalls of hopper 66 via springs 84. Movement of agitator member 82 induces vibration in springs 84 which extend along the open end of chamber 68. The vibration of springs 84 prevents bridging and caking of toner particles being discharged through open end 70 of chamber 68 of hopper 66.

Figure 4:
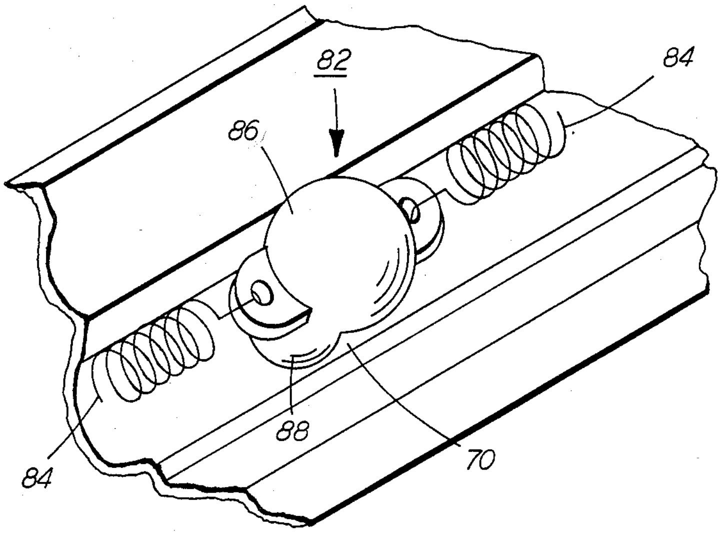
FIG. 4 is an enlarged, fragmentary prospective view depicting the agitating member and the springs attached thereto.

Referring now to FIG. 4, agitator member 82 is connected to the endwalls of hopper 66 by springs 84. Springs 84 are open coil low rate springs. Agitator member 86 is a plastic molded actuator wherein spherical portion 86 and cylindrical portion 88 are molded integrally with one another. As spring member 74 of auger 72 rotates, it engages cylindrical portion 88 of agitator member 82. This causes actuator member 82 to alternately rise and fall imparting oscillation to springs 84. The spring motion, in the path of toner particle discharge, precludes bridging and caking through one oscillation cycle per revolution of spring member 74.

In recapitulation, it is clear that the anti-bridging apparatus of the present invention employs an agitator member which is moved in an upwardly and downwardly direction as the auger transports the residual toner particles away from the cleaning station to a location remote therefrom. The rise and fall of the agitator member imparts oscillation to the springs connecting the agitator member to the endwalls of the hopper. The spring motion in the path of discharge of the toner particles prevents bridging and caking thereof.

It is, therefore, evident that there has been provided in accordance with the present invention an apparatus for preventing bridging and caking of toner particles being discharged from a hopper. This apparatus fully satisfies the aims and advantages hereinbefore set forth. While this invention has been described in conjunction with a specific embodiment thereof, it is evident that many alternatives, modifications, and variations will be apparent to those skilled in the art. Accordingly, it is intended to embrace all such alternatives, modifications, and variations as fall within the spirit and broad scope of the appended claims.

We claim:

1. An apparatus for preventing the bridging and caking of particles in an open ended chamber of a container dispensing the particles therefrom into a transport adapted to move the particles, including:
a member;
a first spring extending from one side of said member to a first wall of the container in the open end of the chamber thereof; and
a second spring extending from the other side of said member to a second wall of the container in the open end of the chamber thereof, said first spring and said second spring freely suspending said member, in the chamber of the container in the region of the open end thereof, in engagement with the transport with said member being agitated as the transport moves the particles causing said first spring and said second spring to vibrate preventing bridging and caking of the particles being dispensed from the open end of the container.

2. An apparatus according to claim 1, wherein said first spring is an open coil low rate spring.

3. An apparatus according to claim 2, wherein said second spring is an open coil low rate spring.

4. An apparatus according to claim 1, wherein the transport is a spiral spring member.

5. An apparatus according to claim 4, wherein said member includes a spherical portion disposed in the open end of the chamber of the container with a protrusion extending outwardly therefrom through the open end of the chamber of the container into engagement with said spiral spring member.

6. An apparatus according to claim 5, wherein said spherical portion and said protrusion of said member are molded integrally with one another.

7. An electrophotographic printing machine of the type having a cleaning station for removing residual toner particles from a photoconductive member, wherein the improvement includes:
a container, in communication with the cleaning station, having an open ended chamber for receiving toner particles removed from the photoconductive member;
means, positioned to receive the toner particles discharged from the open end of the chamber of said container, for transporting the toner particles to a location remote from the cleaning station.
a member;
a first spring extending from one side of said member to a first wall of said container in the open end of the chamber thereof; and a second spring extending from the other side of said member to a second wall of said container in the open end of the chamber thereof, said first spring and said second spring freely suspending said member, in the chamber of said container in the region of the open end thereof, in engagement with said transporting means, with said member being agitated as said transporting means moves the toner particles causing said first spring and said second spring to vibrate preventing bridging and caking of the toner particles being discharged from the open end of the chamber of said container.

8. A printing machine according to claim 7, wherein said first spring is an open coil low rate spring.

9. A printing machine according to claim 8, wherein said second spring is an open coil low rate spring.

10. A printing machine according to claim 7, wherein said transporting means includes a spiral spring member.

11. A printing machine according to claim 10, wherein said member includes a spherical portion disposed in the open end of the chamber of said container with a protrusion extending outwardly therefrom through the open end of the chamber of said container into engagement with said spiral spring member.

12. A printing machine according to claim 11, wherein said spherical portion and said protrusion of said member are molded integrally with one another.

* * * * *